United States Patent [19]

Geerk

[11] 3,967,116

[45] June 29, 1976

[54] MASS SPECTROMETER

[75] Inventor: Jens F. Geerk, Schondorf, Germany

[73] Assignee: Varian Mat GmbH, Bremen, Germany

[22] Filed: Apr. 15, 1975

[21] Appl. No.: 568,349

[52] U.S. Cl. .............................. 250/298; 250/396 R
[51] Int. Cl.[2] ...................... B01D 59/44; G21K 1/08
[58] Field of Search ...................... 250/294, 298, 396

[56] References Cited

UNITED STATES PATENTS

| | | | |
|---|---|---|---|
| 3,135,863 | 6/1964 | Hunt | 250/396 R |
| 3,202,817 | 8/1965 | Belbeoch | 250/396 R |

*Primary Examiner*—Archie R. Borchelt
*Assistant Examiner*—T. N. Grigsby
*Attorney, Agent, or Firm*—Sughrue, Rothwell, Mion, Zinn & Macpeak

[57] ABSTRACT

A mass spectrometer, more particularly for simultaneously measuring beams of a number of species of ions, has a special homogeneous magnetic sector field, the exit boundary of said field forming a straight line which extends through the point of intersection between the central ray of the incident object-ray pencil of ions and the straight entrance boundary of the sector field, and at least one of the emergent image-ray pencils of ions undergoing second-order directional focusing. In this spectrometer, the lateral magnification V lies in the range $O \leq V \leq 1$, the angle of deflection $\phi$ in the sector field is between 70.5° and 131.8°, the angle $\epsilon_1$ between the central ray of the incident object-ray pencil and the perpendicular erected at the point of intersection between the central ray and the entrance boundary is between 0° and 90°, the distance $l_1$ between the object point of the ion source and the point of intersection between the central ray of the object-ray pencil and the straight entrance boundary of the sector field is between 0 and infinity, and the distance $l_2$ between the image point of the ion source and the point of intersection between the central ray of the second-order directionally-focused image-beam pencil and the straight exit boundary of the sector field is between 0.236 and 0.943.

7 Claims, 11 Drawing Figures

4
8
6
10
M

MASS SPECTROMETER

BACKGROUND OF THE INVENTION

The invention relates to a mass spectrometer, more particularly for simultaneously measuring beams of a number of species of ions, having a special homogeneous magnetic sector field, the exit boundary of said field forming a straight line which extends through the point of inersection between the central ray of the incident object-ray pencil of ions and the straight entrance boundary of said field, at least one of the emergent image-ray pencils of ions undergoing second-order directional focusing.

In a known mass spectrometer of this kind (German Patent Specification 140 748) the entrance boundary and the exit boundary of the sector field form a straight, common boundary line. The entrance slit of the object-ray pencil of ions lies on the entrance boundary of the sector field. In the known mass spectrometer (German Specification 1 140 748), in order to reduce the second-order spherical aberration of conventional 180° spectrometers, in which the central ray of the object-ray pencil extends into the entrance slit at right angles to the entrance boundary of the sector field, i.e. at a zero angle $\epsilon_1$ to the line perpendicular to the entrance boundary, and wherein the exit boundary of the exit field coincides with the straight image line containing the image points of the individual image-ray pencils separated by mass, the included angle $\epsilon_1$ is made different from zero, i.e. is chosen between –54° and 0°, the straight image line forming an acute angle with the sector-field boundary. The included angle is negative if, when regarded from the optical axis, it lies on the side towards the centre points of the arcs through which the individual species of ions are deflected; it is positive if it lies on the other side of the optical axis. In the known spectrometers there is only one included angle, i.e. $\epsilon_1 = -35°16'$, at which the second-order spherical aberration is zero, i.e. where second-order directional focusing occurs. In the aforementioned spectrometers, the lateral magnification V is equal to unity, thus greatly limiting their resolving power, i.e. their ability adequately to separate ions having higher mass numbers. Since the angle $\epsilon_1$ is negative, the object-ray pencil in the boundary field of the magnetic sector field is scattered in a direction perpendicular to the deflecting plane of the sector field, thus resulting in considerable losses of intensity.

SUMMARY OF THE INVENTION

An object of the invention is to obviate the shortcomings of known mass spectrometers and provide a sharply-focusing mass spectrometer of the kind in question, which has high resolution, substantially eliminates losses of intensity, and has defining quantities which can easily be selected within wide ranges in accordance with practical conditions.

To this end, according to the invention, the lateral magnification V lies in the range $0 \leq V \leq 1$, the angle of deflection $\phi$ in the sector field is between 70.5° and 131.8°, the angle $\epsilon_1$ betwe:n the central ray of the incident object-ray pencil and the perpendicular erected at the point of intersection between the central ray and the entrance boundary is between 0° and 90°, the distance $l_1$ between the object point of the ion source and the point of intersection between the central ray of the object-ray pencil and the straight entrance boundary of the sector field is between 0 and infinity, and the distance $l_2$ between the image point of the ion source and the point of intersection between the central ray of the second-order directionally-focused image-beam pencil and the straight exit boundary of the sector field is between 0.236 and 0.943, and with one of the freely-selectable pairs of values V, $\phi$; V, $\epsilon_1$; V, $l_1$; V, $l_2$; $\phi$, $\epsilon_1$; $\phi$, $l_1$; $\phi$, $l_2$; $\epsilon_1$; $l_1$; $\epsilon_1$, $l_2$; $l_1$, $l_2$ being given and the radius of deflection $r$ being equal to unity, the other defining quantities are obtained from the equations of condition:

$$\tan \epsilon_1 = -\frac{1+\cos\phi}{\sin\phi} \cdot \frac{3\cos\phi - V^3 + 3V - 1}{3\cos\phi + 2V^3 - 3V^2 + 2} \qquad 7.$$

$$l_1 = \frac{1}{3}\,\frac{\sin\phi}{1+\cos\phi} \cdot \frac{3\cos\phi + 2V^3 - 3V^2 + 2}{(1-V^2)V} \qquad 9.$$

$$l_2 = \frac{1}{3}\,\frac{\sin\phi}{1+\cos\phi} \cdot \frac{-2V^3 - 3V^2\cos\phi + 1}{1-V^2} \qquad 10.$$

for second-order directional focusing of the special sector field. Since the aforementioned pairs of values can be freely selected from the given regions whereas the remaining quantities are determined according to the invention, sharply-focusing mass spectrometers are provided which can be varied in two dimensions, which can be adapted in optimum manner to practical requirements, have high resolution and substantially eliminate losses in intensity through the boundary field of the magnetic sector field. The image-ray pencil with the defining quantities according to the invention can contain different species of ions in succession, if the field strength of the magnetic sector field or the accelerating voltage are varied, and undergoes exact second-order directional focusing. In addition, the other image-ray pencils, more particularly those having masses several octaves removed from the second-order directionally focused mass, usually undergo substantially second-order focusing. If the deflection radius $r$ is introduced as an independent parameter, the defining quantities having a length dimension must be divided by $r$.

In an advantageous embodiment of the mass spectrometer according to the invention, the object-ray pencil is a parallel-ray pencil in which $l_1$ is infinite and V is zero. In this case, the optical axes of the individual ray pencils are geometrically similar, so that all the image-ray pencils undergo second-order directional focusing, i.e. a number of species of ions can simultaneously be measured with second-order directional focusing. The image curve is a straight line, so that the species of ions can advantageously be demonstrated by using a photographic plate or by moving a collecting electrode along a straight rail. Mass spectrometers according to the invention can be varied in an additional dimension, since if V is made equal to zero, only one other of the quantities $\phi$, $\epsilon_1$, $l_1$ and $l_2$ can be freely selected, whereas the other quantities are obtained from the equations given hereinbefore.

Advantageously, a parallel-ray pencil is obtained by disposing an electrostatic radial field upstream of the magnetic sector field, the focal point of the radial field on the side of the object lying in an object aperture; preferably the deflection angle $\phi_e$ of the electrostatic radial field and the deflection angle $\phi$ of the magnetic sector field have opposite senses and are interconnected by the equation $$\sin(\sqrt{2}\,\phi_e) = \frac{1}{2}\sqrt{2}\cdot\frac{3\sin\phi}{3\cos\phi+2} \qquad 11.$$

In the case where the deflection angles $\alpha_e$ and $\phi$ satisfy this equation, the entire image-ray pencil is substantially free from aberration caused by differences in the energy of the ions, i.e. "Chromatic" faults or out-of-focus energy. Admittedly it is known from Zeitschrift fur Naturforschung 10*a* (1955), page 344 (see the same periodical for the derivation of the above equation between $\phi_e$ and $\phi$) to obtain second-order directional focusing for a single image-ray pencil in the case of double-focusing mass spectrometers. The invention, however, provides the first double-focusing mass spectrometers in which all the image-ray pencils can undergo second-order directional focusing in advantageous manner.

To prevent interference to the electrostatic field, the object aperture is disposed at a distance $a_e$ from the electrostatic field given by the equation $$a_e = \tfrac{1}{2}\sqrt{2}\cot(\sqrt{2}\,\phi_e)\, r_e \qquad 17.$$

where $r_e$ is the radius of the electrostatic radial field (for derivation of this equation, see J. Mattauch and R. Herzog, Zeitschrift fur Physik 89 (1934), page 786, formula (26e)).

In another embodiment of the mass spectrometer, wherein the incident object-ray pencil is formed by electrostatic means and has a finite aperture angle, optimum spectrometer efficiency is obtained by good ion-optical use of the magnetic field, i.e. by a wide pencil of rays in the magnetic field resulting in an increase in angular magnification, a decrease in lateral magnification and an increase in resolution.

In an advantageous embodiment of the mass spectrometer according to the invention, the deflection angle $\phi$ of the sector field and the lateral magnification V are determined by the equation of condition $$\cos\phi = \frac{1}{3}\cdot\frac{V^3-3V^2-2}{3V+1} \qquad 12.$$

for second-order directional focusing and aplanasis, the radius of deflection $r$ being equal to unity.

The last-mentioned aplanatic mass spectrometers can be varied in a further dimension, since one of the quantities V and $\phi$ can be freely selected whereas the other quantity is obtained from equation (12) and the other equations given.

By "aplanatic" system we mean a system which sharply focuses a number of neighbouring points on the object plane, e.g. the two points bounding an object slit, the distance between the points depending on the slit width. This condition is satisfied when the lateral magnification V is not dependent, at first approximation, on the aperture angle $\alpha_2$ of the image-ray pencil.

According to another advantageous feature, a variable electrostatic field is disposed upstream of the magnetic sector field so as to produce variable focusing of the object-ray pencil in the direction perpendicular to the deflection plane of the magnetic sector field. If the electric field strength of the electrostatic field is varied, the focal length perpendicular to the deflection plane of the magnetic sector field can be varied without dependence on the boundary fields of the sector field, thus further increasing the sensitivity of the mass spectrometer.

BREIF DESCRIPTION OF THE DRAWINGS

We shall now derive the various equations of condition for various mass spectrometers according to the invention and describe various embodiments with reference to the accompanying drawings, in which.

DESCRIPTION OF PREFERRED EMBODIMENTS

First, we shall derive the equations of condition for second-order directional focusing of the special homogeneous magnetic sector field.

Figures 1, 2:
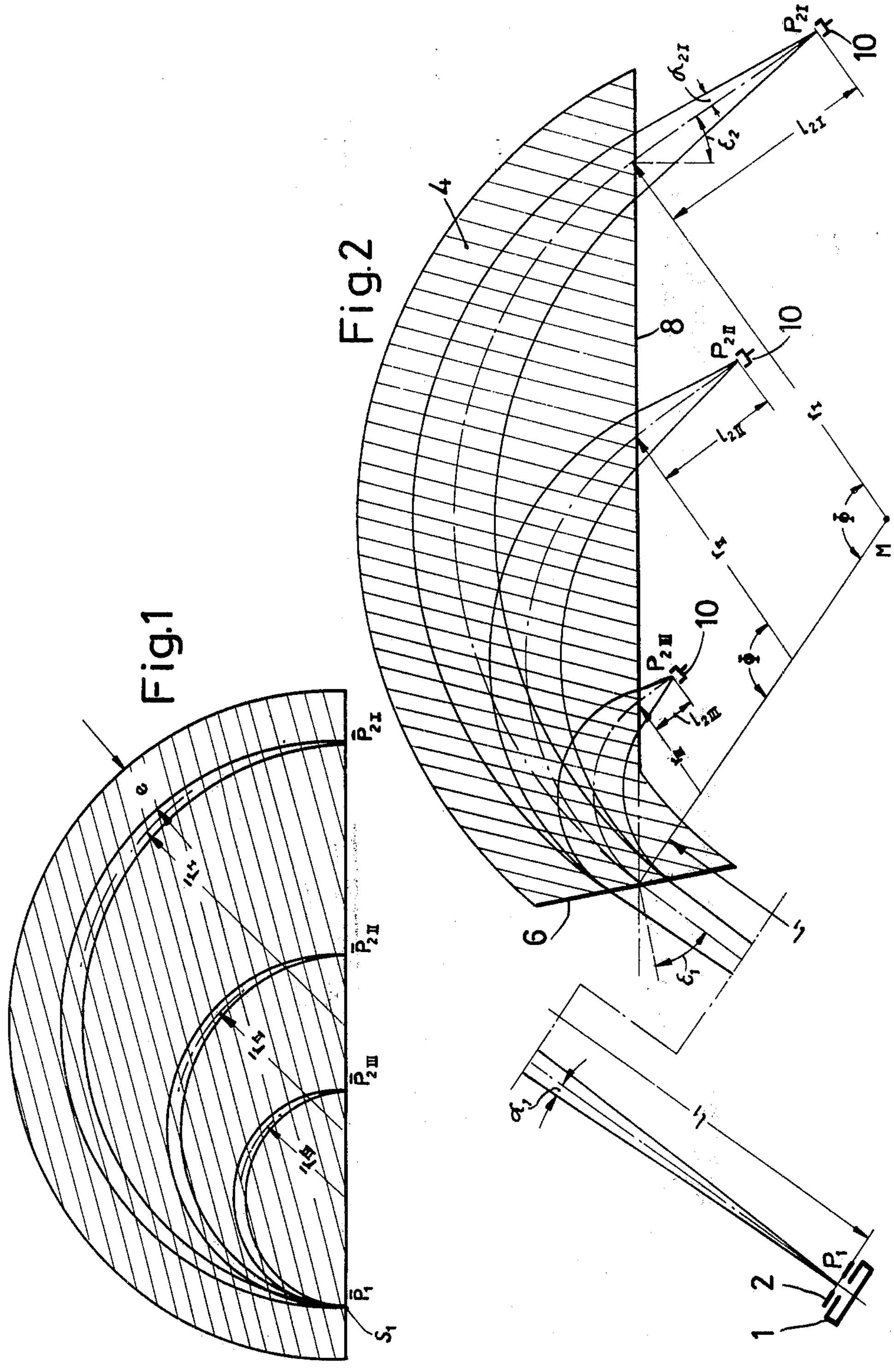
FIG. 1 is a diagram of a known 180° mass spectrometer.
FIG. 2 represents a mass spectrometer according to the invention, having a second-order directionally-focused image-ray pencil.
Figure 3:
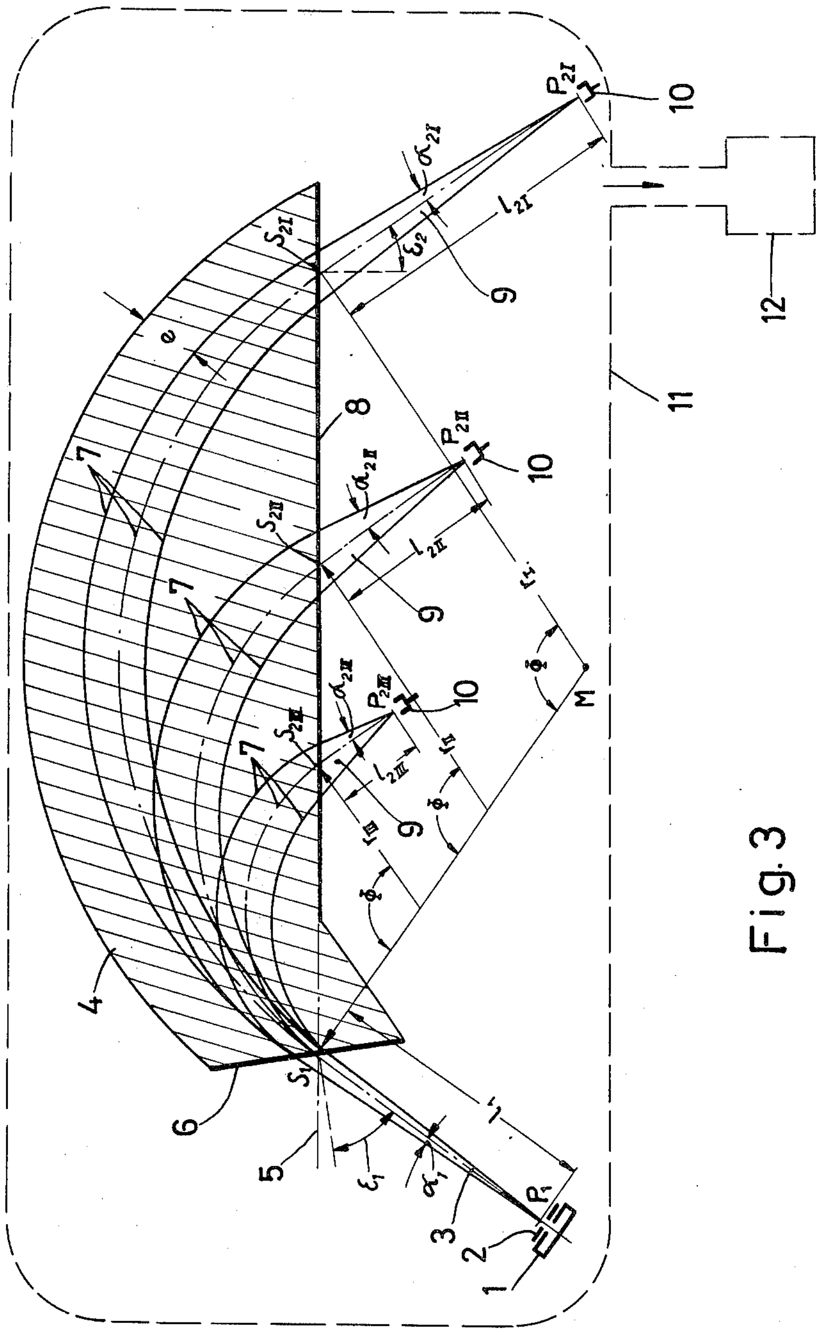
FIG. 3 is a diagram of an aplanatic mass spectrometer according to the invention having a second-order directionally-focused image-ray pencil.
Figure 4:
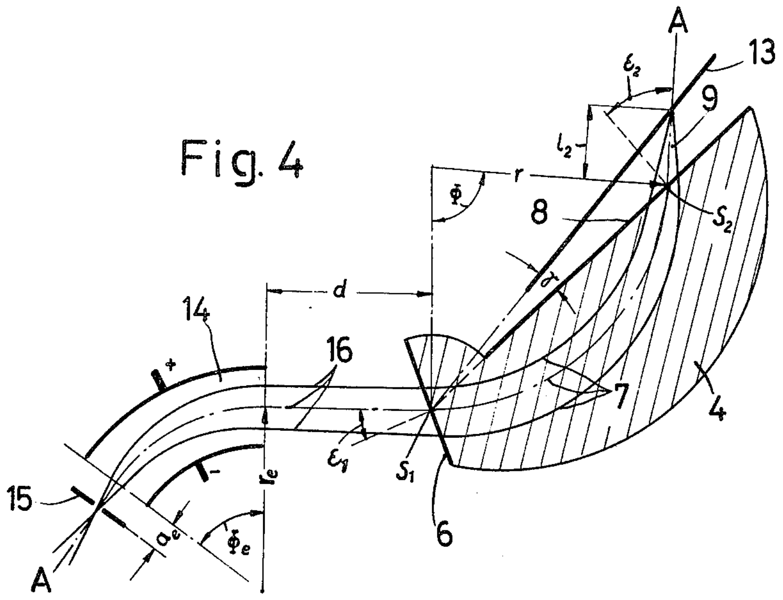
FIG. 4 is a diagram of a double-focusing mass spectrometer according to the invention, wherein all the image-ray pencils undergo second-order directional focusing.

In the case of this special sector field, embodiments of which are shown in FIGS. 2, 3 and 4, the imaginary extension 5 of the straight exit boundary 8 extends through the point of intersection $S_1$ between the central ray of the incident object-ray pencil of ions 3 and the straight entrance boundary 6 of the sector field 4. This can be mathematically expressed by the equations:

$$\epsilon_2 = \tfrac{1}{2}(\phi - \Pi) \qquad 1a.$$

$$\tan\epsilon_2 = -\frac{1+\cos\phi}{\sin\phi} \text{ or} \qquad 1b.$$

$$\tan\epsilon_2 = -\cot(\tfrac{1}{2}\phi) \qquad 1c.$$

In these equations,

- $\epsilon_2$ is the angle between the central ray of an emergent image-ray pencil 9 and a line drawn perpendicular to the point of intersection $S_2$ between the central ray and the exit boundary 8, and
- $\phi$ is the deflection angle of the pencil of rays in the sector field 4.

The following are the known equations of condition for first-order directional focusing of magnetic sector fields in general (see Zeitschrift fur Physik, Vol. 133, pages 513–523 (1952)):

$$l/f = \sin\phi\,(1-\tan\epsilon_1\tan\epsilon_2) - \cos\phi\,(\tan\epsilon_1+\tan\epsilon_2) \qquad 2a.$$

$$l_1/f = 1/V + \cos\phi + \tan\epsilon_2 \sin\phi \quad \text{2b.}$$

$$l_2/f = V + \cos\phi + \tan\epsilon_1 \sin\phi \quad \text{2c.}$$

If we substitute the equation (1b) defining the special magnetic sector field in equations (2a), (2b) and (2c), we obtain the equations of condition for first-order directional focusing of the special sector field:

$$f = \frac{1}{\tan\epsilon_1 - \tan\epsilon_2} \quad \text{3a.}$$

$$l_1 = \left(\frac{1}{V} - 1\right) f \quad \text{3b.}$$

$$l_2 = (V - 1) f + \sin\phi \quad \text{3c.}$$

Here, $l_1$ is the distance between the object point $P_1$ of the ion source 1 and the point of intersection $S_1$ between the central ray of the incident pencil 3 and the straight entrance boundary 6 of sector field 4, $l_2$ is the distance between the corresponding image point $P_{2I}$, $P_{2II}$, $P_{2III}$ of the ion source and the point of intersection $S_{2I}$, $S_{2II}$, $S_{2III}$ between the central ray of an emergent image-ray pencil 9 and the straight exit boundary 8, $f$ is the focal length of the sector field, $\epsilon_1$ is the angle between the central ray of the incident pencil 3 and the perpendicular erected at the point of intersection $S_1$ between the central ray and the entrance boundary 6, and V is the lateral magnification of the sector field.

Angles $\epsilon_1$, $\epsilon_2$ are negative if, when regarded from the optical axis $P_1$, $S_1$ $S_2$, $P_2$, they lie on the side towards the central points M of the arcs in which the individual species of ions are deflected. In the above equations, the radius of deflection $r$ of the pencil of rays in the sector field is made equal to unity. If, however, the radius of deflection is freely chosen and inserted as an additional parameter in the equations of condition, all the quantities denoting a length, i.e. $l_1$, $l_2$ and $f$, must be divided by radius $r$.

In order to obtain the equation of condition for second-order directional focusing (where first-order and second-order spherical aberration are zero), equation (2c) is solved with respect to V, giving:

$$V = l_2/f - \cos\phi - \tan\epsilon_1 \cos\phi \quad \text{3d.}$$

Since, as is known, V is equal to the reciprocal of the angular magnification, the equation:

$$V = \frac{d\alpha_1}{d\alpha_2} = \frac{d\epsilon_1}{d\epsilon_2} = \frac{l_2}{f} \cos\phi - \tan\epsilon_1 \sin\phi \quad \text{3e.}$$

applies for small aperture angles $\alpha_1$, $\alpha_2$ of the object-ray pencil or of the image-ray pencil. Differentiation of this equation with respect to $\epsilon_2$ gives:

$$\frac{dV}{d\epsilon_2} = \frac{1}{f}\frac{dl_2}{d\epsilon_2} - \frac{l_2}{f}\frac{df}{d\epsilon_2} - \frac{d(\cos\phi)}{d\epsilon_2}\tan\epsilon_1$$

$$\frac{d(\sin\phi)}{d\epsilon_2} - \sin\phi\,\frac{d(\tan\epsilon_1)}{d\epsilon_2} \quad \text{3f.}$$

Figure 10:
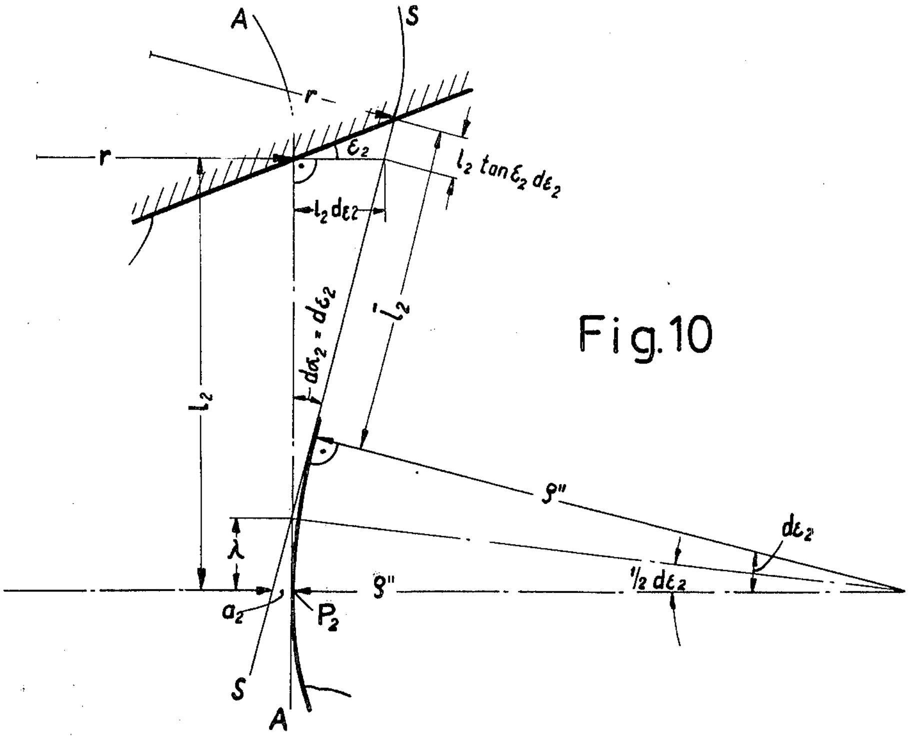
FIG. 10 is a first-order caustic.

From FIG. 10 we obtain:

$$dl_2 = \overline{l}_2 - l_2 - l_2 \tan\epsilon_2\, d\epsilon_2 - \delta'' d\epsilon_2 \text{ and}$$

$$\frac{dl_2}{d\epsilon_2} = l_2 \tan\epsilon_2 - \delta'' \quad \text{3g.}$$

In this equation, $\delta''$ is the radius of curvature of the first-order caustic at the image point $P_2$. A first-order caustic is determined by the fact that two adjacent rays intersect at the points of the caustic curve. A first-order caustic is determined by the fact that three adjacent rays intersect at one point of the caustic curve.

Differentiation of equation (2a) with respect to $\epsilon_2$ gives:

$$df/d\epsilon_2 = -f(\tan\epsilon_2 + V\tan\epsilon_1) \quad \text{3h.}$$

In the case of the differential quotients $$\frac{d(\cos\phi)}{d\epsilon_2}, \frac{d(\sin\phi)}{d\epsilon_2} \quad \text{3i.}$$

and $$\frac{d(\tan\epsilon_1)}{d\epsilon_2} \quad \text{3j.}$$

we obtain:

$$\frac{d(\cos\phi)}{d\epsilon_2} = -\sin\phi(1 + V) \quad \text{3k.}$$

$$\frac{d(\sin\phi)}{d\epsilon_2} = \cos\phi(1 + V) \cdot \frac{d(\tan\epsilon_1)}{d\epsilon_2} = \frac{V}{\cos^2\epsilon_1} \quad \text{3l.}$$

If these differential quotients are inserted in the above relation for $$\frac{d^2\epsilon_1}{d\epsilon_2 2},$$

we obtain:

$$\frac{d^2\epsilon_1}{d\epsilon_2^2} = (1 + 3\, l_2 \tan\epsilon_2)\frac{1}{F} + V^2 \tan\epsilon_1 - V\tan\epsilon_1 - \frac{\delta''}{F} \quad \text{4a.}$$

If we differentiate equation (2b) with respect to $\epsilon_2$ without altering point $P_1$, since all rays pass through this point, we obtain:

$$\frac{d^2\epsilon_1}{d\epsilon_2^2} = -V^3(1 + 3\, l_1 \tan\epsilon_1)\frac{1}{f} + V^2\tan\epsilon_1 - V\tan\epsilon_2 \quad \text{4b.}$$

If $$\frac{d\epsilon_1^2}{d\epsilon_2^2}$$

is eliminated from equations (4a) and (4b), we obtain the following expression for the general sector field if the radius of curvature of the first-order caustic is $\delta''$:

$$\delta'' = V^3 (1 + 3\, l_1 \tan \epsilon_1) + (1 + 3\, l_2 \tan \epsilon_2) \quad 5.$$

From the condition that $\delta''$ is equal to zero, the equation of condition for second-order directional focusing of the general sector field is obtained as follows:

$$V^3 (1 + 3\, l_1 \tan \epsilon_1) + (1 + 3\, l_2 \tan \epsilon_2) = 0 \quad 6.$$

A necessary and adequate equation of condition for second-order directional focusing of the special sector field is obtained as follows, by eliminating the quantities $l_1$, $l_2$, $\epsilon_2$ by means of equations (1*b*), (3*a*), (3*b*), (3*c*):

$$\tan \epsilon_1 = -\frac{1 + \cos \phi}{\sin \phi} \cdot \frac{3 \cos \phi - V^3 + 3V - 1}{3 \cos \phi + 2V^3 - 3V^2 + 2} \quad 7.$$

Quantities $f$, $l_1$ and $l_2$ can be expressed in similar form, i.e. in dependence on V and $\phi$ alone. In additional, $\tan \epsilon_1$ and $\tan \epsilon_2$ are eliminated from equation (3a) by means of equations (7) and (1b), giving:

$$f = \frac{1}{3} \frac{\sin \phi}{1 + \cos \phi} \cdot \frac{3 \cos \phi + 2V^3 - 3V^2 + 2}{(1 - V^2)(1 - V)} \quad 8.$$

We then, using equation (8), obtain the following from equations (3b) and (3c):

$$l_1 = \frac{1}{3} \frac{\sin \phi}{1 + \cos \phi} \cdot \frac{3 \cos \phi + 2V^3 - 3V^2 + 2}{(1 - V^2)\, V} \quad 9.$$

By eliminating $f$ from equations (3b) and 3c) we obtain:

$$V\, l_1 + l_2 = \sin \phi. \quad 9a.$$

Hence, by equation (9) we obtain:

$$l_2 = \frac{1}{3} \frac{\sin \phi}{1 + \cos \phi} \cdot \frac{-2V^3 - 3V^2 \cos \phi + 1}{1 - V^2} \quad 10.$$

Equations (8), (9) and (10), like equation (7), are necessary and adequate equations of condition for second-order directional focusing of the special sector field.

Figure 6:
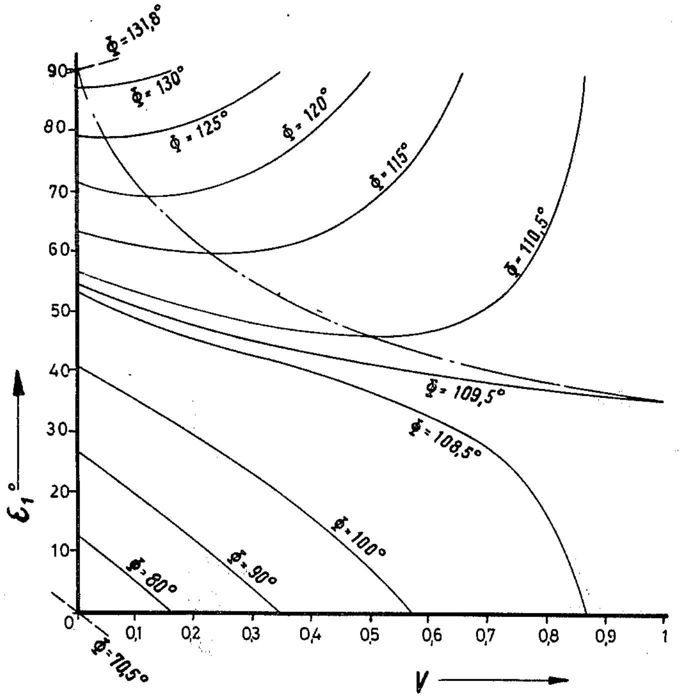
FIG. 6 is a diagram showing the parameters V, $\epsilon_1$, $\phi$ for second-order directional-focusing mass spectrometers according to the invention.
Figure 7:
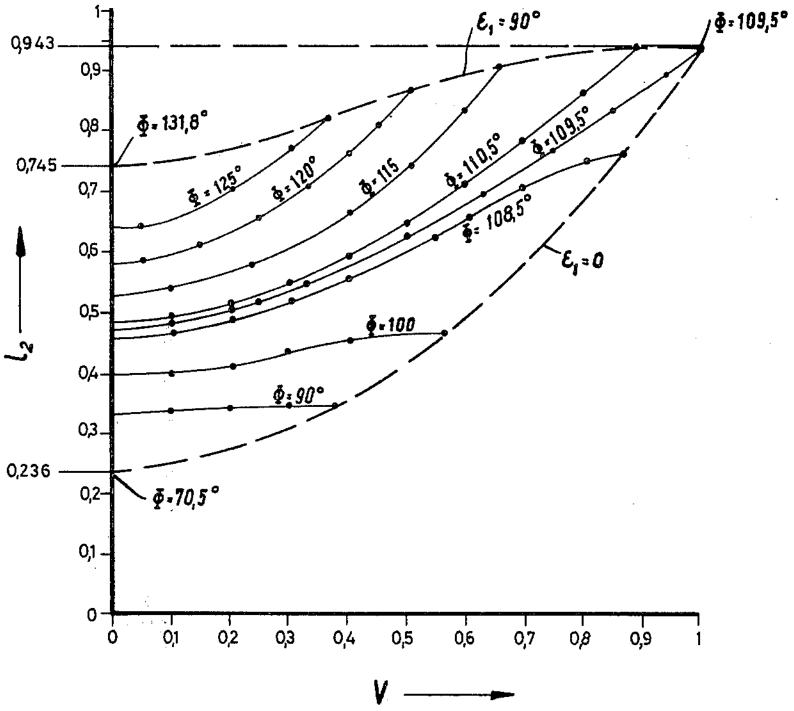
FIG. 7 is a diagram showing the parameters V, $l_2$, $\phi$ for second-order directional-focusing mass spectrometers according to the invention.
Figure 8:
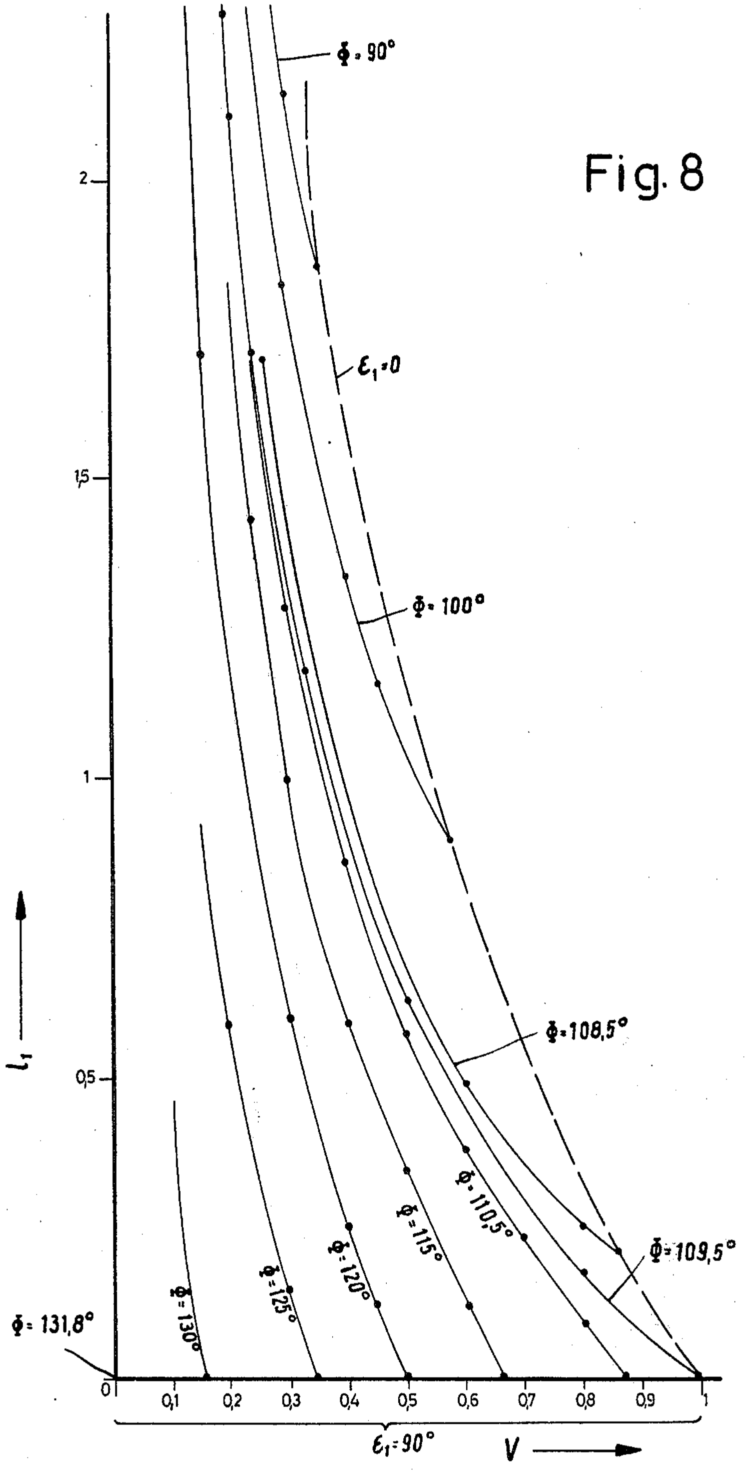
FIG. 8 is a diagram showing the parameters V, $l_1$, $\phi$ for second-order directional-focusing mass spectrometers according to the invention.

FIGS. 6, 7 and 8 show the relevant part of the two-dimensional variety of solutions of equations (7), (9) and (10), i.e. for the corresponding mass spectrometers. FIG. 6 shows $\epsilon_1$ in dependence on V with $\phi$ as parameter. FIG. 7 shows $l_2$ in dependence on V with $\phi$ as parameter and FIG. 8 shows $l_1$ in dependence on V with $\phi$ as parameter. The regions of the families of curves shown in FIGS. 7 and 8 are bounded by $\epsilon_1 = 0°$ and $\epsilon_1 = 90°$. At the point $V = 1$, $\phi = 109.5°$ the solution has a singular point. If we proceed in the direction $V \rightarrow 1$ towards this singular point, we obtain $\epsilon_1 = \epsilon_2 = -35.25°$. This solution does not provide a mass spectrometer according to the invention, since $\epsilon_1$ is negative in this case. If we proceed in the direction $\phi \rightarrow 109.5°$ towards the singular point, we obtain $\epsilon_1 = +35.25°$, i.e. a sector field system according to the invention.

Figure 5:
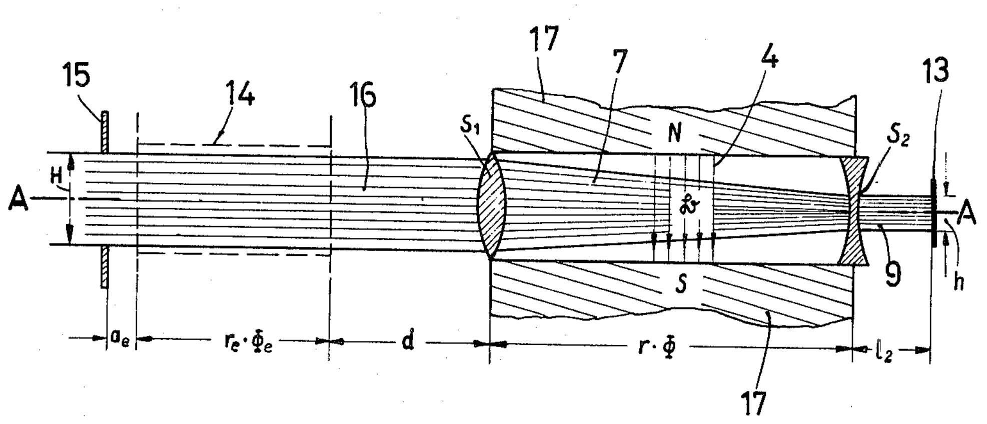
FIG. 5 is a diagrammatic section along line A—A of the embodiment of FIG. 4.

$l_1 = \infty$ is easy to achieve technically, e.g. if the ions leaving the object aperture are formed by an electrostatic acceleration field into a pencil having a finite aperture angle, which is converted by a single elastrostatic lens into a parallel-ray pencil which is directed towards the magnetic sector field. FIGS. 4 and 5 show a single electrostatic lens of the aforementioned kind, in the form of an electrostatic radial field. Consequently, the mass spectrometer shown in FIGS. 4 and 5 is double-focusing, i.e. velocity-and direction-focusing and provides second-order directional focusing for all image-ray pencils, i.e. ions of all masses. Single-dimensional variants of this mass spectrometer are determined by equation:

$$\sin (\sqrt{2}\, \phi_e) = \frac{1}{2} \sqrt{2}\, \frac{3 \sin \phi}{3 \cos \phi + 2} \quad 11.$$

The mass spectrometer having the largest deflection angle $\phi$ is obtained from $\sin (\sqrt{2}\, \phi_e) = 1$ with the quantities (11a) $\phi_e = 63.6°$; $\phi = 87.7°$; $\epsilon_1 = 23.3°$; $\epsilon_2 = -46.2°$; $l_2/r = 0.32$.

In this mass spectrometer, there is a zero distance $a_e$ between the object aperture and the entrance boundary of the electrostatic radial field.

Consequently, one-dimensional variation in the last-mentioned mass spectrometer along the ordinate $V = 0$ in FIG. 6 is bounded at the top by $\epsilon_1 = 23.3°$. In the mass spectrometer shown in FIGS. 4 and 5, the defining quantities have the values (11b) $\phi_e = 55.7°$, $\phi = 87°$, $\epsilon_1 = 22.4°$; $\epsilon_2 = -46.5°$; $\gamma$ (angle between straight image line 13 and exit boundary 8 of the magnetic field) = 7.8°; $l_2/r = 0.317$; $a_e = 0.14\, r_e$.

FIG. 5 shows the shape of the pencil of rays in a plane perpendicular to the deflection plane of the magnetic sector field 4. The slit 15 like the pencil of rays shown, has a height H. The inhomogeneous magnetic edge field, which is at a positive angle $\epsilon_1$ to the optical axis at the entrance boundary 6 of the sector field 4, has a focusing effect on the pencil 16 of parallel rays. In FIG. 5, this process is represented by a collecting lens as used in photo-optics. Between the pole-pieces 17 in a homogeneous magnetic field having a flux density B, ions in pencil 7 are not influenced and move in straight lines. At the exit boundary 8 of the sector field 4, owing to the negative value of $\epsilon_2$, the boundary field has a defocusing effect, which is symbolised in the drawing by a divergent lens. If the defining quantities have the values given, the ions, after leaving the boundary 8, travel in the plane perpendicular to the deflection plane of sector field 4, and reach a photographic plate 13, the pencil line being substantially parallel. In the mass spectrometer shown, the ratio of the pencil height H at the photographic plate 13 to the pencil height H at the object slit has the value 0.4. As a result, the ion flux density at the photographic plate is considerably increased, with a consequent increase in the sensitivity of measurement.

We shall now derive the equation of condition for aplanatic imaging of the special sector field with second-order directional focusing. Aplanatic image formation is characterised in that, as a first approximation, the lateral magnification V is not dependent on the aperture angle $\alpha_2$ of the image-ray pencil, i.e.

$$dV/d\alpha_2 = 0.$$

This differential quotient for the general sector field is obtained from equation (4b), since $$\frac{dV}{d\alpha_2} = \frac{d^2\epsilon_1}{d\epsilon_2^2} \qquad 11c.$$

i.e. $$\frac{dV}{d\alpha_2} = -V^3 (1 + 3l_1 \tan\epsilon_1) \frac{1}{f} + V^2 \tan\epsilon_1 - V \tan\epsilon_2 = 0 \qquad 11d.$$

Elimination of $l_1$ and $f$ by means of the equations of condition (3a) and (3b) gives the following, in the case of first order directional focusing of the special sector field:

$$\frac{dV}{d\alpha_2} = V(V-1)\,[2V\tan\epsilon_1 + (V+1)\tan\epsilon_2] = O \qquad 11c.$$

If the expression in square brackets is zero, the left side of equation (11e) is zero, apart from the points $V = 1$ and $V = 0$, which are neglected here. We thus obtain $$\frac{\tan\epsilon_1}{\tan\epsilon_2} = -\frac{1+V}{2V} \qquad 11f.$$

This is the equation of condition whereby the first-order focused pencil of rays images two adjacent points on the object, e.g. a slit over a large aperture angle having the same magnification.

The required equation of condition for aplanatic image formation of the special sector field with second-order directional focusing is obtained by eliminating $\tan\epsilon_1/\tan\epsilon_2$ by equations (1b) and (7), i.e.

$$\cos 100 = \frac{1}{3} \; \frac{V^3 - 3V^2 - 2}{3V + 1} \qquad 12.$$

Figure 9:
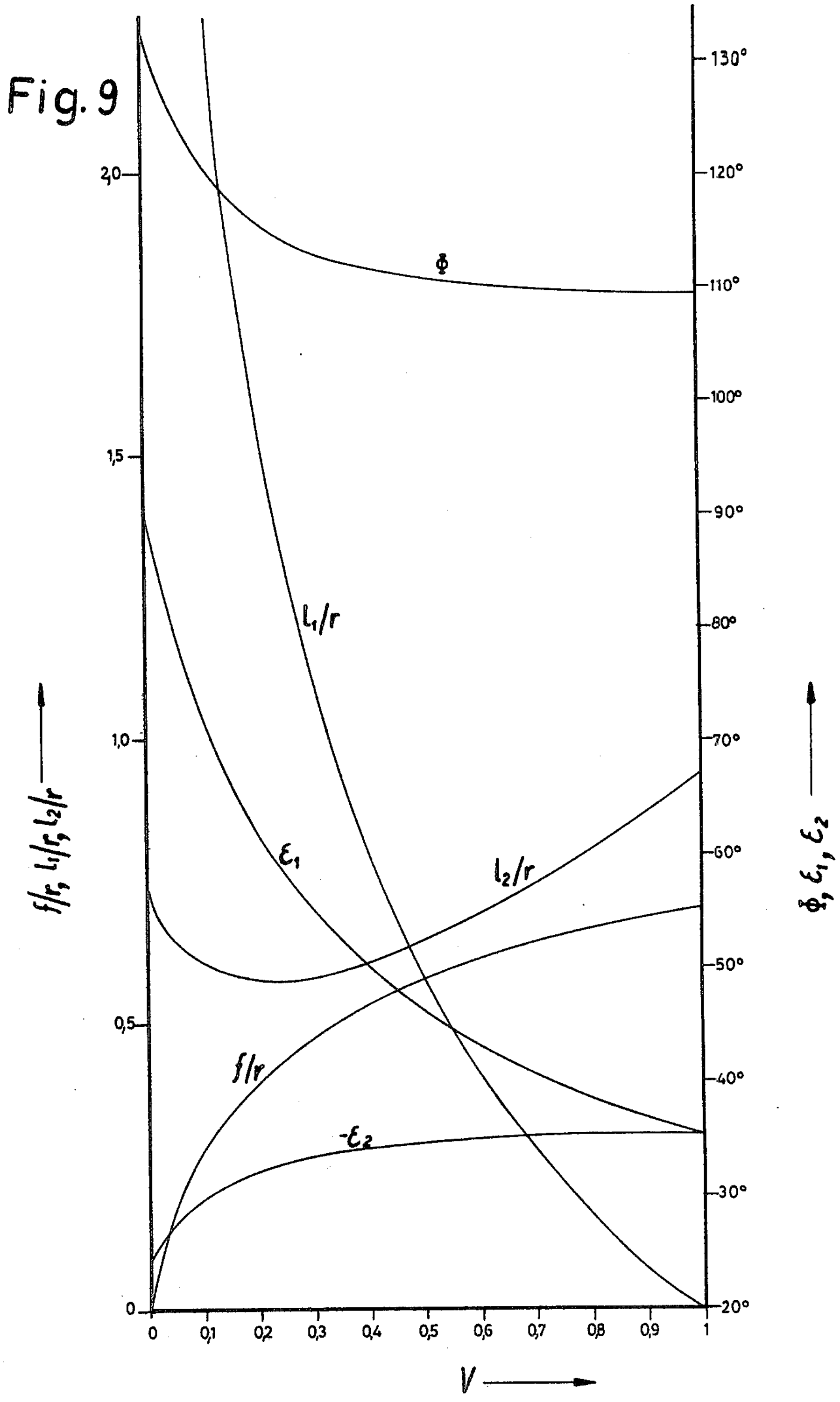
FIG. 9 is a diagram showing the parameters of aplanatic mass spectrometers according to the invention.

We thus obtain a one-dimension variety of special sector-field systems showing aplanatic image formation with second-order directional focusing. If, for example, the magnification V can be freely selected from the region $0 < V < 1$, we can obtain the deflection angle $\phi$ from equation (12) and the defining quantities $\epsilon_2$, $\epsilon_1$, $f$, $l_1$, $l_2$ determining the optical system from equations (1a), (7), (8), (9) and (10). In FIG. 9 the defining quantities $\phi$, $\epsilon_1$, $\epsilon_2$, $f/r$ $l_1/r$, $l_2/r$ are shown graphically as functions of V. This diagram, therefore, contains all the aplanatic special sector-field systems with second-order directional focusing.

In FIG. 6, these aplanatic systems lie on a curve joining the minima of the curves $\phi$ = const, since, if equation (7) is differentiated with respect to V when $\phi$ is constant and if the right side is made equal to zero, we likewise obtain equation (12) after shortening by $(V-1)$ as a condition for a minimum of $\tan\epsilon_1$, i.e. also of $\epsilon_1$. In the case of this aplanatic system, $\epsilon_1$ is restricted to the region between 35° 16′ and 90°.

FIG. 2 shows a non-aplanatic mass spectrometer having an ion source 1, an object aperture 2 and three collector electrodes 10 in the image points $P_{2I}$, $P_{2II}$, $P_{2III}$ of the associated pencil of rays 9. The outer pencil with the image point $P_{2I}$ undergoes second-order directional focusing. For this pencil we have freely chosen $V = 0.3$; $\phi = 108.5°$; $r_1 = 80$ mm. Equations (1a), (7) and (9) then give the defining quantities $\epsilon_2 = 35.75°$; $\epsilon_1 = 43.05°$; $l_1 = 112.7$ mm; these quantities, together with $\phi$, apply equally to all pencils of rays. Half the aperture angle of the object ray pencil 3 is given as $\alpha_1 = 2°$. The optical data, which are different for the three pencils, are given in the following table 1, in which the radius of deflection $r$ was freely chosen in each case and the other data were calculated.

Table 1

| | Image ray pencil at the image point $P_{2I}$ | $P_{2II}$ | $P_{2III}$ |
|---|---|---|---|
| r/mm | 80 | 50 | 20 |
| $l_2$/mm | 42.0 | 23.6 | 8.0 |
| V | 0.3 | 0.21 | 0.10 |
| $\alpha_2$/degrees | 6.7 | 9.5 | 20.6 |
| $a_3$/mm | 0.04 | 0.05 | 0.18 |
| $\frac{dV}{d\alpha_2}$ | 0.08 | 0.08 | 0.05 |

As these data show, the image formation of the internal pencil of rays is also substantially of the second-order, since third-order spherical aberrations are very small in this case also. The third-order spherical aberrations are obtained from the calculation of the radius of curvature of the caustic evolute $$\delta''' = \frac{d\delta''}{d\alpha_2}$$

Figure 11:
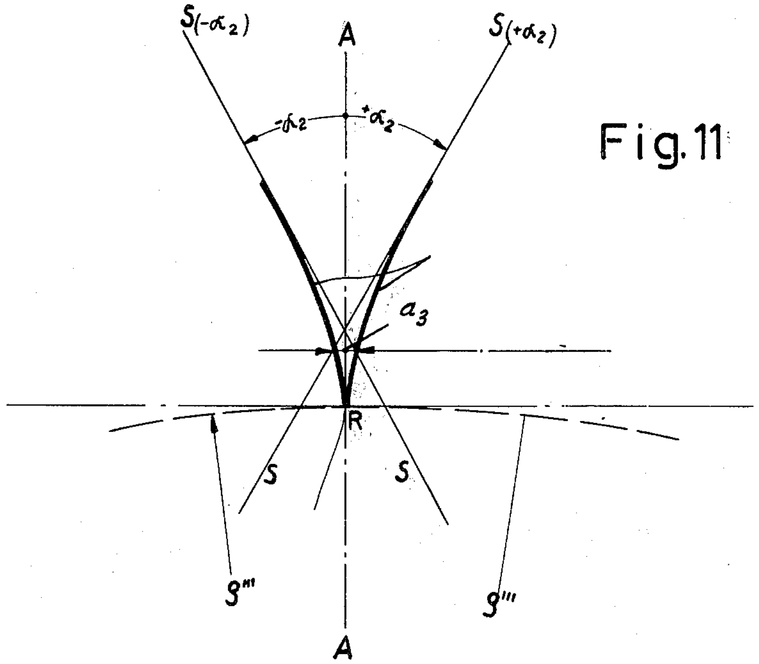
FIG. 11 shows a second-order caustic.

(compare FIGS. 10 and 11). By differentiation of equation (5), with respect to $\epsilon_2$ we obtain:

$$\frac{d\delta''}{d\epsilon_2} = 3[V^4 l_1 (1 + 2\tan^2\epsilon_1) + l_2 (1 + 2\tan^2\epsilon_2)] \qquad 13.$$

$$+ 3V'' V^2 (1 + 3l_1 \tan\epsilon_1) - 3\delta'' \tan\epsilon_2$$

$$V'' = \frac{d^2V}{d\epsilon_2^2}$$

is given by equation (4b). In the case of second-order directional focusing, i.e. $\delta'' = 0$, the last term in equation (13) vanishes.

The caustic of a second-order directionally-focusing system differs from a first-order directionally focusing system in a characteristic manner as shown in FIGS. 10 and 11. FIG. 10 shows a smooth first-order caustic curve, whereas the second-caustic curve in FIG. 11 has a cusp R, where second-order directional focusing occurs.

If the radius of curvature $\delta'''$ of the caustic evolute is calculated from equation (13), the caustic itself is obtained as an evolvent of the evolute at $\delta'' = 0$, if a straight line is rolled in known manner on an arc of radius $\delta'''$. Hence, by an elementary geometrical calculation, the spherical aberration $\alpha_3$ is found to be $$a_3 = \frac{1}{12} \left(\frac{1}{V}\right)^3 \delta''' \alpha_1^3 \qquad 14.$$

where $\alpha_1$ is half the aperture angle of the object ray pencil.

The calculation of the resolution A is based on the definition of the dispersion coefficient D for the general sector field. According to Ewald and Hinterberger, "Methoden und Anwendungen der Massenspektroskopie", Verlag Chemie, Weinheim 1955 page 63, the dispersion coefficient is given by the following equation:

$$D = 1 - \cos\phi + l_2\,[\sin\phi + (1 - \cos\phi)\tan\epsilon_2] \qquad 14a.$$

Since $$\tan\epsilon_2 = -\frac{1+\cos\phi}{\sin\phi}$$

in the special sector-field systems, the contents of the square bracket becomes zero and we have:

$$D = 1 - \cos\phi$$

If M is the mass number of an ion which is accelerated by an electric voltage U and which moves in a magnetic field having a flux density B on an arc of radius $r$, the following equation applies:

$$M \cdot U = \frac{1}{2}\,\frac{e}{m_p}\,r^2 B^2 \qquad 15.$$

where $e/m_P$ is the specific proton charge $0.958 \times 10^8$ Coulomb/kg.. If $r$ and B are given, this equation defines M and U.

A second defining equation for M and U is obtained from the known equation for the resolution A, giving the mass number M of an ion which is just separated from an ion having the mass number M + 1. The equation is:

$$\frac{1}{A} = \frac{1}{M} = 2\,\frac{sV}{rD} + 2\,\frac{a_o}{rD} + \frac{\Delta U}{U} \qquad 16.$$

where $s$ is the width of the entrance slip, and $a_{\cdot o \cdot}$ is the spherical aberration.

All quantities except M and U occurring in equations (15), (16) are given or can be directly calculated, so that the two equations can be used to calculate the resolution A and the attainable acceleration voltage U for each of the systems to be compared.

If, in the embodiment in FIG. 2, we assume that the width of the object slit is $s = 0.3$ mm, the magnetic flux density is $B = 0.45$ Tesla and the fluctuation in the acceleration voltage is $U = 0.5$ V, we find that the resolution is $A = 231$ and the acceleration voltage is $U = 268$ V.

Accordingly, this mass spectrometer is just capable of providing complete separation between ions having mass numbers 231 and 232.

FIG. 3 shows an aplanatic mass spectrometer having an ion source 1, an object aperture 2 and three collector electrodes 10 at the image points $P_{2I}$, $P_{2II}$, $P_{2III}$ of the associated pencil of rays. The drawing also shows a vacuum chamber 11 which contains the mass spectrometer and which is evacuated by a vacuum pump 12. The outer pencil of rays, having a deflection radius $r_I = 80$ mm, forms the object slit at a magnification $V = 0.5$ at the image point $P_{2I}$ in aplanatic manner $dV/d\alpha_2 = 0$). Calculation shows that the inner pencils, which have deflection radii $r_{II} = 50$ mm, $r_{III} = 30$ mm and form image points $P_{2II}$, $P_{2III}$, form an equally sharp, but not aplanatic image of the object slit.

The image curve is very slightly bent. Point $P_{2II}$ is only 0.6 mm away from the straight line passing through points $P_{2I}$ and $P_{2III}$.

The following dimensions apply equally to the three pencils having the image points $P_{2I}$, $P_{2II}$, $P_{2III}$: $\phi = 110.5°$; $\epsilon_1 = 46.2°$; $\epsilon_2 = -34.75°$; $l_1 = 46.1$ mm; $\alpha_1 = 2°$.

The optical data, which are different for the three pencils, are shown in the following table 2, in which the deflection radii $r$ are freely chosen in each case and the other data are calculated.

Table 2

| | Image ray pencil with image point | | |
|---|---|---|---|
| | $P_{2I}$ | $P_{2II}$ | $P_{2III}$ |
| r/mm | 80 | 50 | 30 |
| $l_2$/mm | 51.9 | 29.1 | 15.6 |
| V | 0.5 | 0.385 | 0.273 |
| $\alpha_2$/degrees | 4 | 5.2 | 7.3 |
| $a_3$/mm | 0.010 | 0.011 | 0.018 |
| $\frac{dV}{d\alpha_2}$ | 0 | 0.04 | 0.07 |

The surface area of the sector field in FIG. 3 is about 58 $cm^2$.

For comparison, FIG. 1 shows a known 180° mass spectrometer having three collector electrodes 10 at the image points $P_{2I}$, $P_{2II}$, $P_{2III}$ and a sector field having the same surface area (58 $cm^2$) as the sector field shown in FIG. 3, which forms aplanatic images. Clearly, we have a real basis for comparing the efficiency of the two kinds of sector field, since the surfaces of the pole pieces are equal and the magnets are therefore equally expensive. In addition, the aperture angles of the object ray pencils are equal (half the aperture angle $\alpha_1 = 2°$) so that, if the acceleration voltage is the same, both spectrometers obtain the same intensity from ion source 1. We assume that both the systems to be compared have permanent magnets having a magnetic flux density B = 0.45 Tesla in the air gap, and acceleration voltage having a variation $\Delta U = 0.5$ V, and an object slit having a width $s = 0.3$ mm.

In the case of the 180° spectrometer we find that if, in both systems, the same distance $e$ (e.g. 10 mm) is assumed between the outer ion path and the edge of the sector field, the maximum radius of deflection is only $r_I = 50$ mm.

The spectrometers to be compared have the following resolution A and acceleration voltage U:

The known 180° mass spectrometer: $A = 107$, $U = 227$ V when the collector electrode 10 is at the image point $P_{2I}$.

The aplanatic mass spectrometer according to the invention: $A = 214$, $U = 290$ V for the collector electrode 10 at the image point $P_{2I}$.

The image width is 0.43 mm for the 180° mass spectrometer but 0.25 mm for the aplanatic mass spectrometer according to the invention. If the width of the collector slit is made equal to the image width, the total stream of ions flows into the collector electrodes, and the pencils are still completely separated.

Consequently, the aplanatic mass spectrometer according to the invention separates ions having mass numbers (214/215) which are twice as high as in the known 180° mass spectrometer (107/108); an additional advantage is that the acceleration voltage (290 V) of the aplanatic mass spectrometer according to the invention is higher than the acceleration voltage (227 V) of the known 180° mass spectrometer.

The following result was obtained on comparing the resolution or intensity at the collector electrode 10 at image point $P_{2II}$ of the aplanatic mass spectrometer according to the invention with the resolution at the collector electrode 10 at image point $P_{2I}$ in the known 180° mass spectrometer:

The known 180° mass spectrometer: $A = 107$, $U = 227$ V, $s = 0.3$ mm.

The aplanatic mass spectrometer according to the invention:

There are three possibilities for selecting A, U, *s:* a. Maximum resolution $A = 148$, $U = 164$ V, $s = 0.3$ mm.

Accordingly, ions having mass numbers 148/149 are just completely separated. The resolution, therefore, is greater than that of the known 180° mass spectrometers.

b. $A = 168$, $U = 227$ V, $s = 0.3$ mm, and U and $s$ are given.

In this case, ions having the mass number 107 are trapped in the collector electrode 10 at image point $P_{2II}$ as in the 180° mass spectrometer. Owing, however, to the higher resolution ($A = 168$) the peaks 107/108 are widely separated, whereas they are only just separated in the 180° mass spectrometer.

c. $A = 107$, $U = 227$ V.

As in the 180° mass spectrometer, ions having mass numbers 107/108 are just completely separated. The width of the object slit is 0.6 mm, i.e. twice as much as in the 180° mass spectrometer. Consequently, the intensity can be doubled for the same resolution 107/108 and the same acceleration voltage $U = 227$ V. The mass spectrometric efficiency of the aplanatic mass spectrometer at the collector electrode at image point $P_{2II}$ is therefore greater even than the efficiency of the 180° mass spectrometer at the collector electrode at image point $P_{2I}$.

By the term "field boundary" is to be understood, as usual, the so-called "effective field boundary". As is known, one cannot produce a sharply defined "chopped off" magnetic field between the poles of a magnet because of the stray field. One counts therefore on a substitute field, of which the boundaries, the "effective field boundaries", — considering the change in direction of the field vector — are displaced slightly parallel to the edges of the pole piece. This substitute field is strongly homogeneous and at the boundaries falls away infinitely steeply.

I claim:

1. A mass spectrometer, more particularly for simultaneously measuring beams of a number of species of ions, having a special homogeneous magnetic sector field, the exit boundary of said field forming a straight line which extends through the point of inersection between the central ray of the incident object-ray pencil of ions and the straight entrance boundary of said field, at least one of the emergent image-ray pencils of ions undergoing second-order directional focusing, characterised in that the lateral magnification V lies in the range $0 \leqq V \leqq 1$, the angle of deflection $\phi$ in the sector field (4) is between 70.5° and 131.8°, the angle $\epsilon_1$ between the central ray of the incident object-ray pencil (3) and the perpendicular erected at the point of intersection between the central ray and the entrance boundary (6) is between 0° and 90°, the distance $l_1$ between the object point ($P_1$) of the ion source (1) and the point of intersection ($S_1$) between the central ray of the object-ray pencil (3) and the straight entrance boundary (6) of the sector field (4) is between 0 and infinity and the distance $l_2$ between the image point ($P_{2I}$, $P_{2II}$, $P_{2III}$) of the ion source and the point of intersection ($S_{2I}$, $S_{2II}$, $S_{2III}$) between the central ray of the second-order directionally-focused image-beam pencil and the straight exit boundary (8) of the sector field (4) is between 0.236 and 0.943, and if one of the freely-selectable pairs of values V, $\phi$; V, $\epsilon_1$; V, $l_1$; V, $l_2$; $\phi$, $\epsilon_1$; $\phi$, $l_1$; $\phi$, $l_2$; $\epsilon_1$, $l_1$; $\epsilon_1$, $l_2$; $l_1$, $l_2$ is given and if the radius of deflection $r$ is equal to unity, the other defining quantities are obtained from the equations of condition:

$$\tan \epsilon_1 = - \frac{1 + \cos \phi}{\sin \phi} \cdot \frac{3\cos \phi - V^3 + 3V - 1}{3\cos \phi + 2V^3 - 3V^2 + 2} \qquad 7.$$

$$l_1 = \frac{1}{3} \frac{\sin \phi}{1 + \cos \phi} \cdot \frac{3\cos \phi + 2V^3 - 3V^2 + 2}{(1 - V^2)\, V} \qquad 9.$$

$$l_2 = \frac{1}{3} \frac{\sin \phi}{1 + \cos \phi} \cdot \frac{-2V^3 - 3V^2 \cos \phi + 1}{1 - V^2} \qquad 10.$$

for second-order directional focusing of the special sector field (4).

2. A mass spectrometer as claimed in claim 1, characterised in that the object-ray pencil is a parallel-ray pencil (6) in which $l_1$ is infinite and V is zero.

3. A mass spectrometer as claimed in claim 2, characterised by an electrostatic radial field (14) which is disposed upstream of the magnetic sector field (4) and which has a focus on the object side which lies in an object aperture (15), the angle of deflection $\phi_e$ of the electrostatic radial field (14) and the angle of deflection $\phi$ of the magnetic sector field (4) being in opposite senses and related by the equation:

$$\sin(\sqrt{2}\,\phi_e) = \frac{1}{2} \sqrt{2}\, \frac{3 \sin \phi}{3 \cos \phi + 2}. \qquad 11.$$

4. A mass spectrometer as claimed in claim 3, characterised in that the object aperture (15) is disposed in front of the electrostatic radial field (14) at a distance $a_e$ which prevents interference with the electrostatic field and is determined by the equation:

$$a_e = \frac{1}{2} \sqrt{2} \cot(\sqrt{2}\,\phi_e)\, r_e \qquad 17.$$

where $r_e$ is the radius of the electrostatic radial field (14).

5. A mass spectrometer as claimed in claim 1, characterised in that the incident object-ray pencil (3) is formed by electrostatic means and has a finite aperture angle ($\alpha_1$).

6. A mass spectrometer as claimed in claim 1, characterised in that the deflection angle $\phi$ of the sector field (4) and the lateral magnification V are determined by the equation of condition:

$$\cos \phi = \frac{1}{3} \cdot \frac{V^3 - 3V^2 - 2}{3V + 1} \qquad (12)$$

$$\cos 100 = \frac{1}{3} \frac{V^3 - 3V^2 - 2}{3V + 1} \qquad 12.$$

for second-order directional focusing and aplanasia, the radius of deflection $r$ being equal to unity.

7. A mass spectrometer as claimed in claim 1, characterised in that a variable electrostatic field is disposed upstream of the magnetic sector field (4) so as to produce variable focusing of the object-ray pencil in the direction perpendicular to the deflection plane of the magnetic sector field (4).

* * * * *